United States Patent
Lee et al.

(10) Patent No.: US 8,760,136 B2
(45) Date of Patent: Jun. 24, 2014

(54) DYNAMIC VOLTAGE SCALING INTERFACE

(75) Inventors: Gordon Lee, Gilbert, AZ (US);
Christopher K.Y. Chun, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 588 days.

(21) Appl. No.: 12/660,951

(22) Filed: Mar. 8, 2010

(65) Prior Publication Data

US 2011/0215779 A1 Sep. 8, 2011

(51) Int. Cl.
*G05F 1/00* (2006.01)
*H02M 3/156* (2006.01)

(52) U.S. Cl.
USPC .......................................... 323/283; 323/351

(58) Field of Classification Search
USPC ................... 323/283, 351; 713/300
See application file for complete search history.

(56) References Cited

U.S. PATENT DOCUMENTS

| | | | |
|---|---|---|---|
| 6,548,991 B1 * | 4/2003 | Maksimovic et al. | 323/351 |
| 6,870,410 B1 * | 3/2005 | Doyle et al. | 327/149 |
| 6,992,405 B2 * | 1/2006 | Zhang et al. | 307/140 |
| 7,149,903 B1 | 12/2006 | Chan et al. | |
| 2005/0218871 A1 | 10/2005 | Kang et al. | |
| 2007/0096775 A1 | 5/2007 | Elgebaly et al. | |

OTHER PUBLICATIONS

Bill Chew, Dynamic Voltage Scaling Conserves Portable Power, Jan. 10, 2002, EDN, pp. 65-66, 68.*

* cited by examiner

*Primary Examiner* — Jue Zhang

(57) ABSTRACT

A switcher system or circuit and corresponding methods provide dynamic voltage scaling. One embodiment of an apparatus includes: a switcher controller configured to monitor a signal from a processor for a first state, determine a time that the signal is in the first state, and provide an adjustment signal based on the time, and a power supply coupled to the adjustment signal and configured to provide a variable supply voltage to the processor core, the variable supply voltage controlled by the adjustment signal after the determining a time.

20 Claims, 5 Drawing Sheets

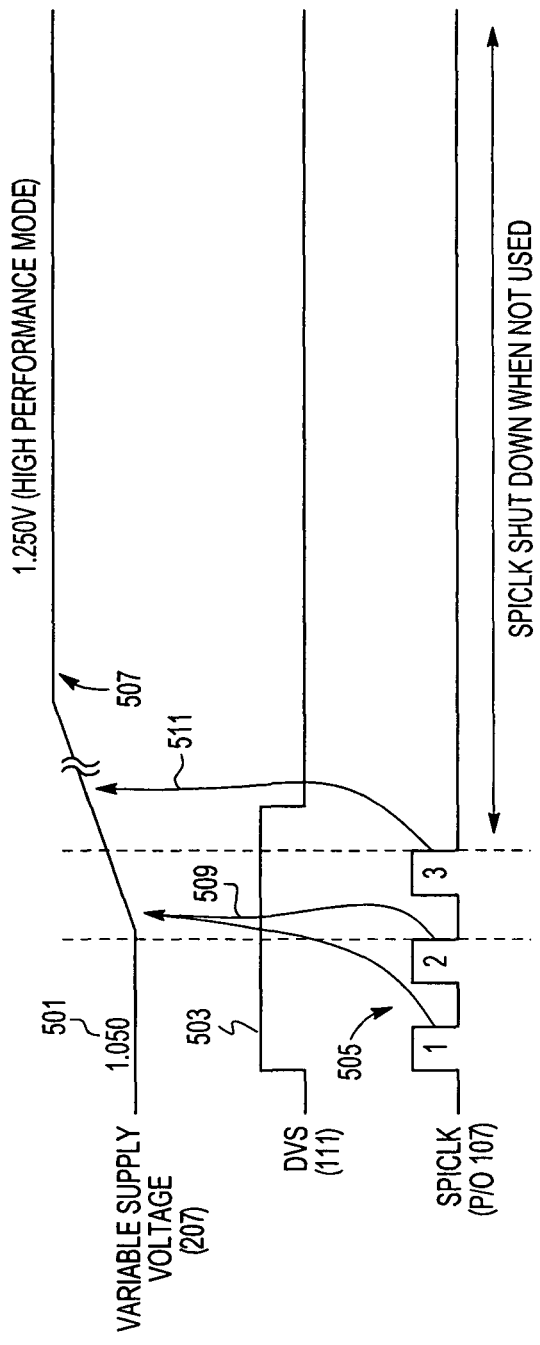

DYNAMIC VOLTAGE SCALING INTERFACE

FIELD OF THE INVENTION

This invention relates in general to dynamic voltage scaling interfaces and more specifically to techniques and apparatus for controlling a dynamic voltage scaling interface (DVSI).

BACKGROUND OF THE INVENTION

Dynamic voltage scaling is known and is an approach whereby power dissipation in digital hardware, e.g., microprocessors, etc., can be limited. As is known power dissipation of CMOS and similar semiconductor technologies increases with switching frequencies (clock frequencies) as well as power supply voltage. On the other hand, processing capacities increase with increased switching frequency and this may require increased supply voltages.

Thus, an increase in power supply voltage may be required to increase a processor or other switching core clock frequency. Minimizing power dissipation requires that the supply voltage closely match the voltage that is required to accommodate the switching frequency that is needed to handle present processing loads.

Some prior art systems use an open loop system to control the DVSI. Open loop systems normally have to be operated conservatively (lots of margin) in order to account for worst case process and temperature variations. This typically results in significant power dissipation over an otherwise optimized system.

Closed loop systems in theory could compensate for the process and temperature variations. Embodiments of prior art closed loop DVSI control systems have suffered from undue latency between a recognition that power supply voltage should or could be adjusted and thus, undue dissipation occurs or processing latencies suffer.

BRIEF DESCRIPTION OF THE DRAWINGS

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

FIG. 5 is a further illustration depicting representative signals versus time in accordance with one or more embodiments.

DETAILED DESCRIPTION

In overview, the present disclosure concerns dynamic voltage scaling, e.g., as can be used for reducing power consumption in complex circuitry with varying work loads and more specifically techniques and apparatus for dynamic voltage scaling that are arranged and constructed for minimizing latency between an indicated need for a change in voltage and making that change. More particularly various inventive concepts and principles embodied in methods and apparatus will be discussed and disclosed, whereby a dynamic voltage scaling signal is monitored and dependent on the state of that signal an adjustment signal is provided to a power supply.

The applications for dynamic voltage scaling may vary widely but include general purpose processor cores and other complex processing systems, such as cellular phone base band processing units or cores. The disclosed apparatus and methods can be particularly advantageously utilized to save significant power consumption, provided they are practiced in accordance with the inventive concepts and principles as taught herein.

This disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in integrated circuits (ICs) including possibly application specific ICs or ICs with integrated processing controlled by embedded software or firmware. It is expected that one of ordinary skill, notwithstanding possibly significant effort and many design choices motivated by, for example, available time, current technology, and economic considerations, when guided by the concepts and principles disclosed herein will be readily capable of generating such programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts of the various embodiments.

Figure 1:
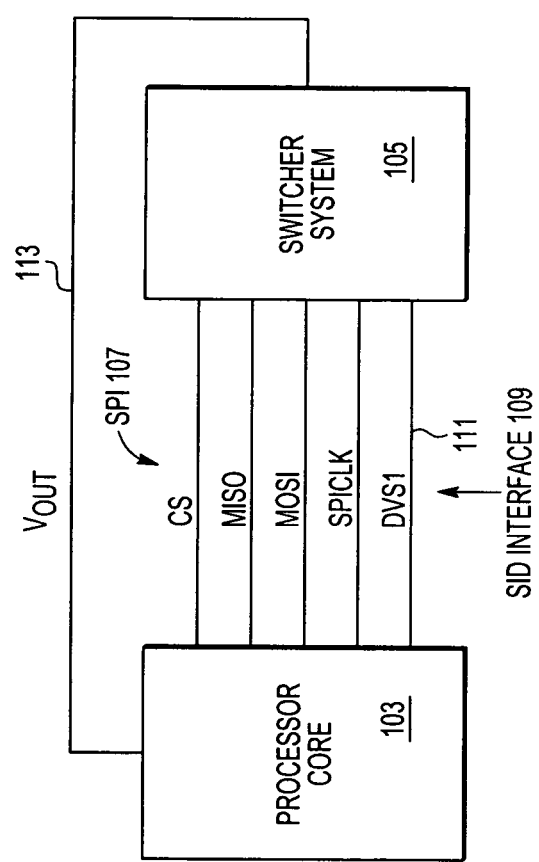
FIG. 1 depicts in a simplified and representative form, a high level diagram of a processor core and switcher system in accordance with one or more embodiments.

Referring to FIG. 1, a simplified and representative high level diagram of a processor or processor core and switcher system in accordance with one or more embodiments will be briefly discussed and described. In FIG. 1 a processor core 103 is shown coupled to a power or voltage regulator, e.g., a switcher system 105 via a serial interface bus, e.g., serial peripheral interface (SPI) bus 107, as well as a dynamic voltage scaling (DVS) path 111. The serial bus 107 with the DVS path 111 and corresponding DVS signal can be referred to as a switcher increment decrement (SID) interface 111. As illustrated and known an SPI bus includes a CS (chip select) connection, a MISO (Master In/Slave Out) connection, MOSI (Master Out/Slave In) connection, and a SPICLK (Clock) connection.

Generally the switcher system 105 functions or operates as a switching power supply under the control of the processor core 103 to provide a supply voltage or variable supply voltage on path 113 to the processor core. The processor core 103 is configured to provide the DVS signal based, e.g., on present or anticipated load or processing load. The switcher system 105 is coupled to the DVS path 111 and thus DVS signal and coupled to the processor core by the serial interface bus 107 and is configured to provide the supply voltage or variable supply voltage at 113 to the processor core 103. The processor core 103 uses the serial interface bus or SPI bus to communicate with the switcher system for enabling various functionality and initializing or setting various control or controllable parameters, such as normal, nominal, or highest performance supply voltage, upper and lower limits for the supply voltage, step size and distributions of step size for the variable supply voltage, rate of adjustment or slew rate for the supply voltage during a change, etc. It will be appreciated that the processor core and switcher system can be implemented in one or more integrated circuits (ICs) and if more than one IC, these can be more or less collocated or located in different locations.

Figure 2:
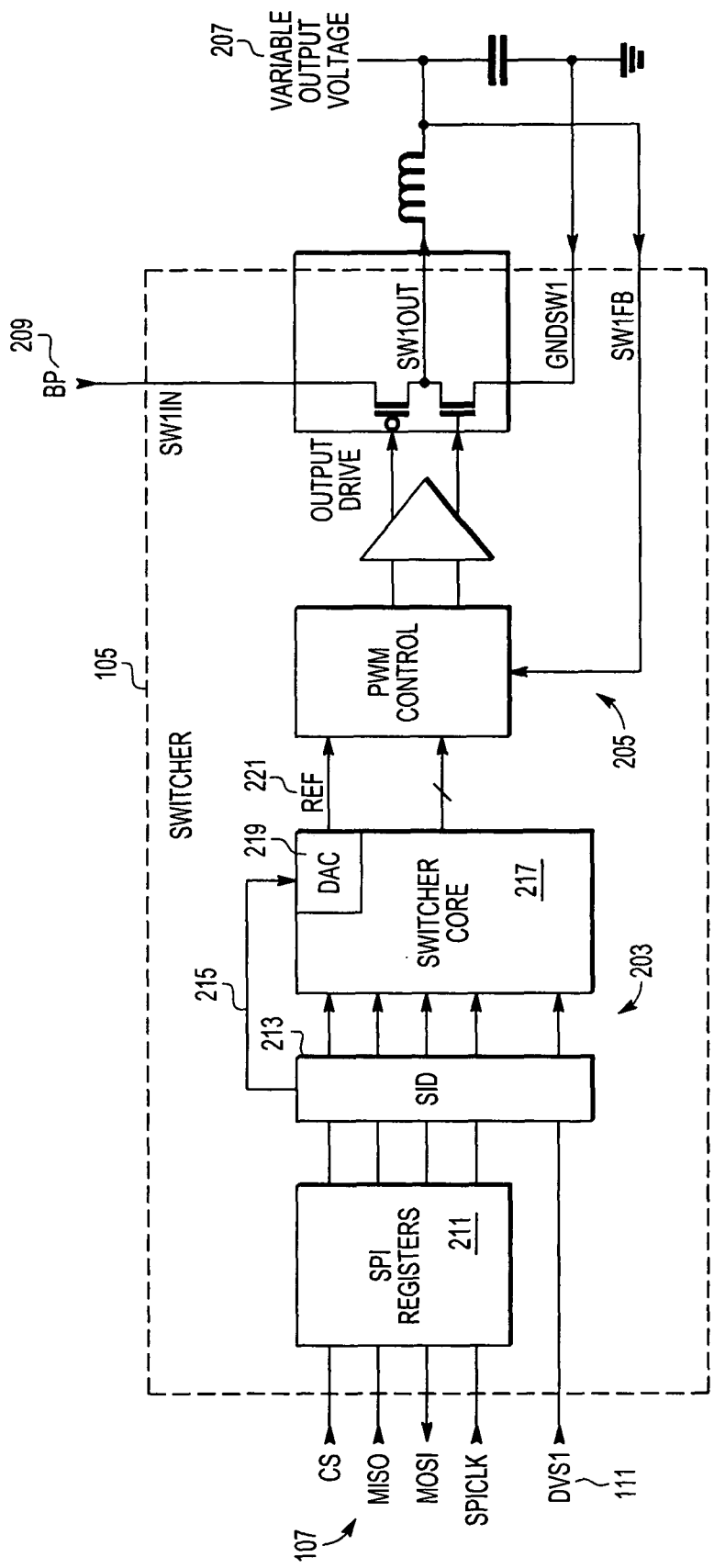
FIG. 2 in a representative form, shows a more detailed diagram of an embodiment of a switcher system, such as the switcher system of FIG. 1.

Referring to FIG. 2, a representative and more detailed diagram of an embodiment of a switcher system, such as the switcher system of FIG. 1 will be briefly discussed and described. FIG. 2 illustrates a switcher system such as or similar to the switcher system 105 of FIG. 1 with the serial bus 107 and DVS path 111 or DVS signal coming from and normally coupled to the processor system 103 (not specifically shown). Generally the switcher system 105 includes a switcher controller 203 and a power supply 205, where the power supply is controllable and configured to provide a supply voltage or variable supply voltage 207 to the processor core.

Generally the power supply will be a switching power supply, e.g., a buck regulator as shown or any other controllable supply, where the supply is arranged to convert a base power voltage at 209 to the variable supply voltage at 207. As depicted the switching power supply of FIG. 2 includes a pulse width modulation (PWM) control which is used to drive an output stage and an inductor capacitor filter wherein the variable output voltage or corresponding signal is fed back to the PWM control and compared to a reference signal at 221. This comparison as is known is used to maintain the variable supply voltage at a given level or setting. By varying the reference signal the variable supply voltage can be changed or adjusted. The serial bus 107 or the SPI bus is coupled to the switcher controller 203, specifically various registers or SPI registers 211 with the bus used to communicate between the switcher system or switcher controller 203 and the processor core 103. As noted above the processor core can use the bus to enable various functionality as well as initialize or modify various programmable parameters.

Further included in the switcher controller 203 and intercoupled as shown in addition to the registers 211 is a Switcher Increment Decrement (SID) 213 providing an adjustment signal at 215, switcher core 217 with a digital to analog convertor (DAC) 219, which provides a reference signal at 221. Outputs from the registers 211 are shown coupled to or through a Switcher Increment Decrement (SID) 213 and the dynamic voltage scaling (DVS) path 111 and thus DVS signal is also coupled to or through the SID 213.

The switcher system 105 or switcher circuit provides dynamic voltage scaling and as shown comprises the switcher controller 203, which among other duties is configured to monitor the DVS signal from the processor core for a first state, e.g., in some embodiments the DVS signal goes from a low state to a high state, determine a time that the DVS signal is in the first or high state, and provide the adjustment signal at 215, where the adjustment signal is based on the time that the DVS signal is in the first state. Further included as depicted is a power supply 205 which is coupled to the adjustment signal via the DAC 219 (i.e., power supply is coupled to reference signal at 221) and configured to provide a variable supply voltage at 207 to the processor core 103, where the variable supply voltage, in some embodiments, is controlled by the adjustment signal with low latency after the determining a time or in some instances after the end of the first state, i.e., the adjustment signal is provided with low or zero latency. It will be appreciated that the variable supply voltage will require some time to adjust after an adjustment signal is provided.

In some embodiments, the time can be assessed or determined by the switcher controller 203, specifically SID by monitoring a clock, such as the serial bus clock or SPI clock and counting clock pulses or edges, e.g., falling edges. Nearly any clock of sufficient accuracy could be used, however the serial bus clock or specifically the SPI clock may be useful since this clock is normally active only when some communication is occurring and both the processor core and switcher controller have access to the same clock.

In varying embodiments, the switcher circuit specifically the switcher controller 205 is configured to use the adjustment signal at 215 to decrement the variable supply voltage when the time that the DVS signal is in the first state is a first count or value, e.g., only one clock pulse or edge and to increment the variable supply voltage when the time that the DVS signal is in the first state is a second count or value or exceeds the threshold count, e.g., at least two clock pulses or edges. Other embodiments change the variable supply voltage to a high performance state when the time that the DVS signal is in the first state is a third value, e.g., three or more pulses or edges.

The specific relationships between the first state and timing therein and the action of the switcher controller and power supply will be further discussed below with reference to the examples shown in FIG. 4 and FIG. 5. For now we can think of the relationship in these terms: if the first state is not present no adjustment is made; if the first state lasts for at least a first value (e.g., one clock edge) but no more, the power supply or variable supply voltage is reduced or decremented by one step; if the first state lasts for at least a second value (e.g., two clock edges) or more, the power supply or variable supply voltage in incremented by, e.g., one step; and if the first state lasts for a third value (e.g., three clock edges) or more, the power supply is adjusted, e.g., normally incremented, through a number of voltage steps to reach a predetermined and normally high or highest performance state.

It will be appreciated that using the serial bus or SPI clock is one among various approaches, since using this clock automatically allows for initiating an update of the variable supply voltage, since there will be no clock edges until the clock is activated. Furthermore, once a decrement or increment of the variable supply voltage is underway no further adjustments are initiated until the adjustment underway has been completed.

It will also be appreciated that the SID 213 and DAC and the interface between the registers 211, SID 213, and switcher core 217 at least with respect to adjusting the DAC and thus reference voltage and hence variable supply voltage can be implemented in hardware and thus any latency is very low or substantially zero, i.e., latencies for adjusting the variable supply voltage or at least reference signal at 221 are going to be limited to a few gate delays once a time has been determined. As illustrated the SID provides the adjustment signal at 215 and this signal can be formed with combinatorial logic based on the SPI clock and DVS signal. The adjustment signal would have an increment state, decrement state, and a state indicating a predetermined state. It will be appreciated that the adjustment signal could be provided via register outputs from the SID as these outputs in relevant part can be hardware coupled to the DAC.

Thus FIG. 1 and FIG. 2 have shown a system or an integrated circuit with dynamic voltage scaling where the system comprises in varying embodiments a processor or processor core 103 configured to provide a signal, e.g., dynamic voltage scaling (DVS) signal, at 111; a switcher system 105 coupled to the DVS signal and coupled to the processor core by a serial interface bus 107 and configured to provide a variable supply voltage at 113, 207 to the processor core. The switcher system further comprises; a switcher controller 203 configured to monitor the DVS signal at 111 for a first state, determine a time that the DVS signal is in the first state, and provide an adjustment signal at 215 or the like or the reference signal at 221, wherein the adjustment signal is based on the time that the DVS signal is in the first state. Further included in the switcher system 105 in some embodiments is a power supply 205 coupled to or to receive the adjustment signal and configured to provide the variable supply voltage, wherein the variable supply voltage is adjusted or an adjustment begins with limited latency or in some instances substantially zero latency after the determine a time is performed.

In some embodiments the system, specifically the switcher controller 203 or SID 213 is configured to determine a time that the DVS signal is in the first state by counting clock edges, e.g., falling clock edges of a clock, e.g., SPI clock, during the first state. In varying embodiments, the switcher controller or SID 213 is configured to provide an adjustment signal, where the adjustment signal is based on a number of clock edges of a clock during the first state or during the presence of the first state. The switcher controller is configured to use the adjustment signal to incrementally change the variable supply voltage, wherein the direction of the change is based on the number of clock edges of the clock while the DVS signal is in the first state. In some embodiments, the switcher controller is configured to use the adjustment signal to decrement the variable supply voltage when the number of clock edges is a first number (only one), to increment the variable supply voltage when the number of clock edges is a second number (at least two), and to change the variable supply voltage to a predefined state or highest performance state (typically highest supply voltage) when the number of clock edges is a third number (three or more).

As depicted and in some embodiments, the switcher controller 203 further comprises one or more registers 211 where one register includes a voltage step parameter that is programmable and the switcher controller then uses the adjustment signal to change the variable supply voltage by this or these voltage steps. The voltage step or steps can be of various characteristics including, e.g., one of a fixed voltage step and a non uniform voltage step. For example the variable supply voltage may be limited to a maximum value of 1.2 volts and a minimum value of 1.0 volts and the voltage steps could be a fixed value of 25 millivolts, 10 millivolts, or the like, i.e. a uniform step size throughout the voltage range. Alternatively, the voltage steps can be non uniform or non linear. Perhaps with the 1.2 to 1 volt example the steps can be 10 millivolts near, e.g., within 5 steps of, the 1.1 volt variable supply voltage level and outside of that range the step size could be 25 millivolts. This would allow for relatively precise control of the variable supply voltage in, e.g., a range of normal operation. Various other distributions of step size may allow a more carefully targeted or controlled supply voltage and thus contribute to power dissipation savings or possibly quicker stepping to targeted voltages when coarser steps can be tolerated.

In any event the switcher controller can utilize the adjustment signal to vary or adjust the power supply from a programmable supply voltage, e.g., a normal and predetermined setting and possibly a high performance setting or from any present setting to any of a multiplicity of voltage settings between an upper and a lower limit. Furthermore the rate that the variable supply voltage is changed can also be programmed into one of the registers 211 and used to control the rate of adjustment or slew rate of the variable supply voltage. A typical slew rate can be, e.g., 4 microseconds to transition through a 25 millivolt step.

It will be appreciated that the outputs from the registers 211 to or through the SID can or are likely to be parallel outputs or at least there will be a serial to parallel conversion going on somewhere in the switcher system. It is also noted that the switcher system 105 can operate with prior art processor cores wherein a change in supply voltage is indicated by writing an instruction to a register, rather than as here with a DVS signal of predetermined characteristics. This is accomplished by having a processor core that is capable of using the new and improved DVS approach and so indicate that to the switcher system by enabling the SID via one of the registers 211.

If a prior art processor core is coupled to the switcher system of FIG. 2; the SID 213 can behave as a transparent pass through for control information and the over all system can operate as previously known. If the processor core is able to provide the suitable DVS signals, it can enable the SID, etc. and send DVS signals with the appropriate predetermined characteristics (e.g., active state duration) for causing a decrement or increment from a present variable voltage, or reversion to another predetermined voltage. Thus the switcher system 105 can be utilized with conventional DVS approaches or with the new DVS approach at the discretion of a processor core.

Figure 3:
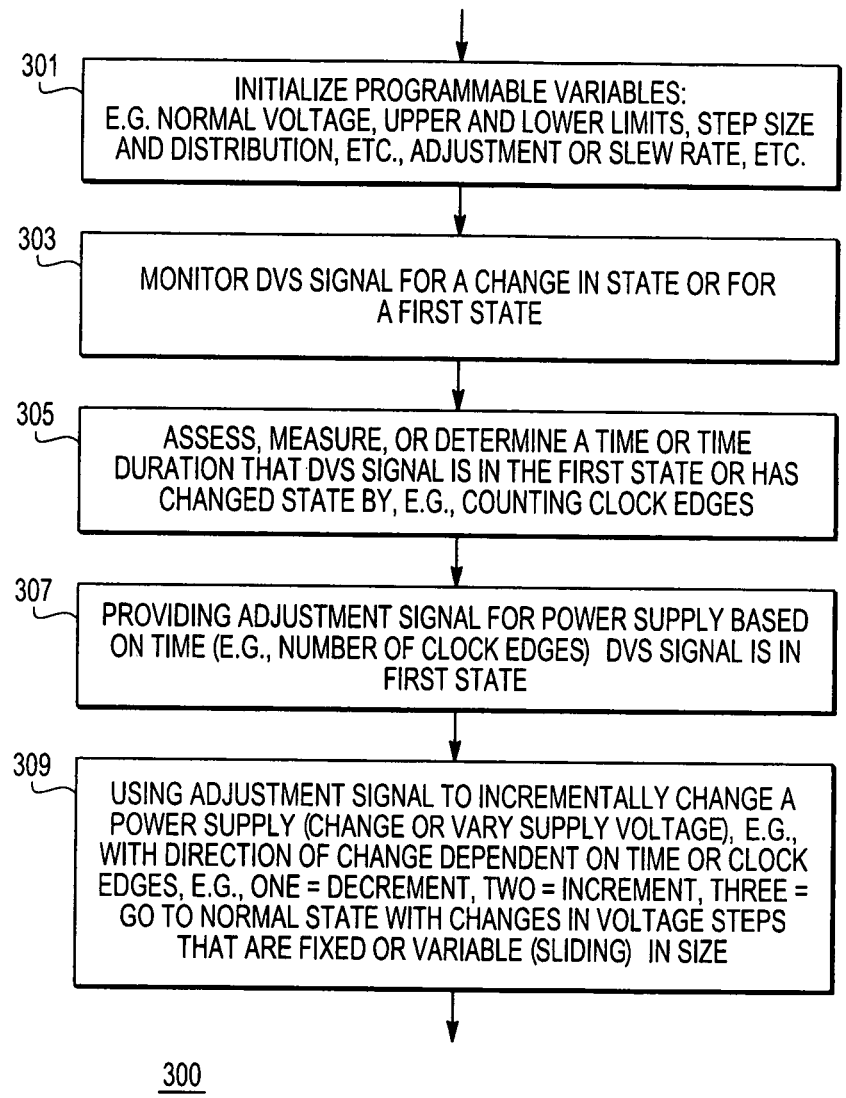
FIG. 3 shows a flow chart illustrating representative embodiments of a method of dynamic voltage scaling in accordance with one or more embodiments.

Referring to FIG. 3, a flow chart illustrating representative embodiments of a method of dynamic voltage scaling in accordance with one or more embodiments will be discussed and described. The methods illustrated in FIG. 3 can be practiced by the apparatus of FIG. 1 and FIG. 2 or other apparatus with similar functionality and capability. It will also be appreciated that the method of FIG. 3 can be repeated as needed. FIG. 3 begins with initializing 301 programmable variables, such as normal supply voltage, upper and lower limits, voltage step size and distributions, adjustment or slew rates, etc.

FIG. 3 after 301 shows in overview and one or more embodiments a method of dynamic voltage scaling 300 comprising: monitoring 303 a dynamic voltage scaling DVS signal for a first state; decoding a state of the DVS signal by, e.g., assessing 305 a time that the DVS signal is in the first state; and providing 307 an adjustment signal to a power supply for real time dynamic adjustments of a supply voltage, wherein the adjustment signal is based on the assessing a time that the DVS signal is in the first state.

In more detailed embodiments, the assessing a time can comprises counting clock edges 305 during the first state and wherein the providing an adjustment signal further comprises providing an adjustment signal that is based on the number of clock edges 307 during the first state. In varying embodiments, the adjustment signal is used to incrementally change 309 the supply voltage, wherein the direction of the change is based on the time or number of clock edges while the DVS signal is in the first state. In some embodiments of the method 300, the adjustment signal is used to decrement the supply voltage when the number of edges is one, to increment the supply voltage when the number of edges is two or more, and to change the supply voltage to a predefined state (e.g., highest performance state) when the number of edges is three or more.

In many embodiments, the adjustment signal or use thereof results in the power supply changing by a voltage step, wherein the voltage step can be programmable. The method can use a voltage step or multiplicity of steps that is/are one or more fixed voltage steps, one or more variable voltage steps with a first step having a size that varies from a second step, or some other distribution of steps. The providing an adjustment signal to a power supply can be used in some embodiments to adjust the supply voltage from a predefined supply voltage to any of a multiplicity of voltage settings between an upper and a lower limit.

The method 300 in varying embodiments, includes providing an adjustment signal to a power supply, wherein the adjustment signal is based on a number of clock edges that occur while the DVS signal is in the first state and wherein the adjustment signal is provided immediately after the number of clock edges is determined and wherein the supply voltage is adjusted at a programmable slew rate or rate of adjustment, e.g., over one, two, three SPI clock cycles. As noted above, the method 300 can include the state decoding, e.g., assessing a time and the providing an adjustment signal being performed in hardware with substantially zero latency between assessing the time or an end of the first state and an adjustment or beginning of an adjustment of the supply voltage.

Figure 4:
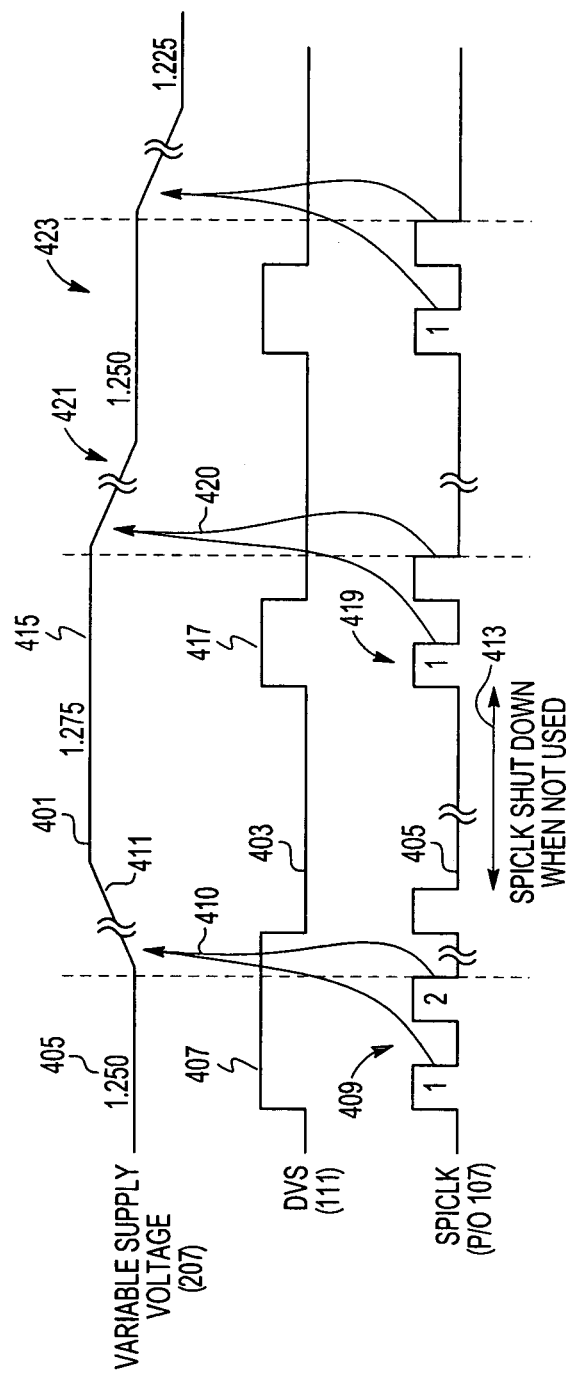
FIG. 4 is an illustration depicting representative signals versus time in accordance with one or more embodiments.

Referring to FIG. 4 and FIG. 5, illustrations depicting representative signals versus time in accordance with one or more embodiments will be discussed and described. As shown the variable supply voltage at 207 is depicted on the graph as 401, the DVS signal at 111 is shown as 403 and the clock (part of 107) is shown as 405. FIG. 4 illustrates the variable supply voltage initially at 1.25 volts 405, the DVS signal going high 407 and staying high for more than two falling clock edges 409. This results 410 in the variable supply voltage increasing to 1.275 volts at 411 with substantially zero latency. It will be appreciated that the SPI clock is often shut down or disabled when not in use 413; however the clock can continue to run for other communications purposes, system clocking needs, or the like. With the variable supply at 1.275 volts 415, the DVS signal goes high 417 but only remains high for one falling edge 419. This results 420 in the variable supply voltage being decremented or reduced 421 to 1.25 volts, starting at the second SPI clock (when it is evident that the DVS signal is no longer high). This decrementing process is repeated at 423 with DVS signal going high for one falling edge. The incrementing or decrementing can continue but are limited by high and low limits (not specifically shown) respectively.

FIG. 5 illustrates a situation wherein the variable supply voltage needs to be increased significantly. With the variable supply voltage at 1.05 volts 501, the DVS signal goes high 503 and remains high for three falling edges of the clock 505. This results 507 in the variable supply voltage stepping all of the way back to 1.25 volts, i.e., a predefined or predetermined high performance mode or voltage. It is noted that the variable supply voltage is first incremented after the DVS signal has remained high for two clock edges 509 and continues to be incremented after the third clock edge 511. Again it is noted that the increments or decrements illustrated in FIG. 4 and FIG. 5 occur or begin to occur with substantially zero latency, which is a clear advantage over prior art systems.

For example in some prior art systems, without the SID 213 and DVS signal, a core processor would write a value or instruction into one of the registers 211 and this would be used to change the variable supply voltage. Unfortunately writing to the register over a SPI bus can require a lengthy transaction including address and data bits, e.g., a 32 bit word, which if the SPI clock is 26 Mhz is approximately 1230 ns (nanoseconds). As noted above a step down (decrement) or step up (increment) requires only 2 clock cycles—approximately 77 ns or about 16 times faster than prior art systems. This delay or latency can waste power while the supply voltage is being reduced or result in unacceptable performance from the processor core until the supply has been increased.

An approach for incrementing or decrementing the operating set point or variable supply voltage from a power supply or plurality of supplies, e.g., a switcher supply A and a switching supply B has been described which can result in improved DVS interfaces for Dynamic Process and Temperature Compensation (DPTC) in support of fine tuning DVS power for the processor supply tree or any other power loads that can benefit from an efficient low latency control scheme for regulator stepping or voltage control. This can include, e.g., analog circuitry, Radio Frequency systems, etc. and parametric stepping of other circuit outputs besides voltage such as current or frequency attributes or variables. An increment command will increase the set point voltage by a programmable step, e.g., a single 25 mV step; a decrement command will decrease the set point by a programmable step, e.g., by a single 25 mV step. The transition time or slew rate for the step can be programmed for DVS stepping. If a switcher power supply runs out of programmable range (in either direction), then the increment or decrement command will be ignored.

The Switcher Increment/Decrement (SID) function can be enabled by a processor core via a command communicated over a serial bus. This can reassign the function of the DVS pins from a default toggling between Normal and DVS operating modes to a increment/decrement control mode for the switcher supply that the DVS signal is assigned to. Once enabled, the switcher supply being controlled will start at the Normal mode set point as programmed and await any SID commands from the processor. One adjustment scheme is a direct signal at 213 from the SID to the DAC and another adjustment or control scheme essentially intercepts the Normal mode set point SPI bits (i.e., but not DVS or Standby programmed set points) and makes any necessary adjustments based on up or down commands. The modified set point bits are then immediately passed to the switching regulator via the DAC, and the regulator would then do a DVS step in the appropriate direction. The SPI bits containing Normal mode or high performance mode programmation are not directly altered.

When configured for SID mode, a low on the DVS path pin results in no action while a high pulse (of sufficient duration) on the DVS path pin will indicate one of 3 actions to take, with the decoding or action as a function of how many contiguous SPI clock falling edges are seen while the DVS pin is held high with the actions shown in the following table and as illustrated in FIG. 4 and FIG. 5.

TABLE 1

| SID Control Protocol | |
|---|---|
| Number of SPI CLK Falling Edges while DVSx = 1 | Function |
| 0 | No action Switcher stays at its presently programmed configuration |
| 1 | Decrement or down: Drive buck switcher output down a single DVS step |

TABLE 1-continued

SID Control Protocol

| Number of SPI CLK Falling Edges while DVSx = 1 | Function |
|---|---|
| 2 | Increment or up: Drive buck switcher output up a single DVS step |
| 3 or more | Panic Mode: DVS step the buck switcher output to the Normal mode value or high performance mode as programmed in the SPI register |

The SID protocol and alternative approach to variable supply adjustment or control is illustrated by way of example, assuming that SID is enabled (SIDEN=1) and that DVSB (DVS for switching supply B) is controlling switching supply SWB (B signifies one of a plurality of switching supplies). SWB starts out at a default or normal value of, e.g., 1.250V (e.g., set SWB to 11010) and can be stepped both up and down via the DVSB pin. The normal or default (SPI bits SWB=11010) do not change. The set point adjustment (bit change) takes place in the SID block 213 prior to bit delivery to the switcher's digital control core 217.

SID Panic Mode as illustrated in FIG. 5 is provided for rapid recovery to the programmed Normal or high performance supply voltage so the processor can quickly recover to its High Performance capability with a minimum of communication latency. In FIG. 5, Panic Mode recovery is illustrated as an Increment step initiated by the detection of the second falling SPI clock edge, followed by a continuation to the programmed level (1.250V in this example) due to the detection of the third contiguous falling edge of SPI clock while DVSB is held high.

The processes, apparatus, and systems for dynamic voltage scaling, discussed above, and the inventive principles thereof are intended to and can alleviate lack of accuracy or undue latency issues caused by prior art DVS techniques. Using these principles of directly signaling the DVS direction given an assumption that direction is the initially important information, the processes, apparatus, and systems for dynamic voltage scaling can quickly yield an accurate variable supply voltage setting and thus power dissipation savings and appropriate processing capabilities with relatively minimal or no costs and the like.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method of dynamic voltage scaling comprising:
monitoring a dynamic voltage scaling DVS signal for a first state, the DVS signal indicative of a desired change in a supply voltage for a processor;
assessing a time that the DVS signal is in the first state;
providing an adjustment signal to a power supply for real time dynamic adjustments of the supply voltage, wherein the adjustment signal is based on the assessing a time that the DVS signal is in the first state; and
wherein the assessing a time further comprises counting clock edges during the first state.

2. The method of claim 1 wherein the providing an adjustment signal further comprises providing an adjustment signal that is based on the number of clock edges during the first state.

3. The method of claim 2 wherein the adjustment signal that is based on the number of clock edges during the first state is used to incrementally change the supply voltage, wherein the direction of the change is based on the number of clock edges while the DVS signal is in the first state.

4. The method of claim 2 wherein the adjustment signal that is based on the number of clock edges during the first state is used to decrement the supply voltage when the number of clock edges is one, to increment the supply voltage when the number of clock edges is two, and to change the supply voltage to a predefined state when the number of clock edges is three or more.

5. The method of claim 2 wherein the supply voltage is decremented when the number of clock_edges is less than a first count and wherein the supply voltage is incremented when the number of clock edges is greater than a count threshold.

6. The method of claim 1 wherein using the adjustment signal results in the power supply changing by a voltage step, wherein the voltage step is programmable.

7. The method of claim 6 wherein the voltage step is one of a fixed voltage step and a variable voltage step with a first step having a size that varies from a second step.

8. The method of claim 1 wherein the providing an adjustment signal to a power supply is used to adjust the supply voltage from a predefined supply voltage to any of a multiplicity of voltage settings between an upper and a lower limit.

9. The method of claim 1 wherein the providing an adjustment signal to a power supply, wherein the adjustment signal is based on a number of clock edges that occur while the DVS signal is in the first state and wherein the adjustment signal is provided immediately after the number of clock edges is determined and wherein the supply voltage is adjusted at a programmable rate of adjustment.

10. The method of claim 1 wherein the assessing a time and the providing an adjustment signal are performed in hardware with substantially zero latency between the assessing a time and beginning an adjustment of the supply voltage.

11. An integrated circuit with dynamic voltage sealing comprising:
a processor core configured to provide a dynamic voltage scaling (DVS) signal, the DVS signal indicative of a desired change in a supply voltage for the processor core;
a switcher system coupled to the DVS signal and coupled to the processor core and configured to provide a variable supply voltage to the processor core, the switcher system further comprising:
a switcher controller configured to monitor the DVS signal for a first state, determine a time that the DVS signal is in the first state (e.g., see FIGS. 1-5), and provide an adjustment signal, wherein the adjustment signal is based on the time that the DVS signal is in the first state,
wherein a power supply coupled to receive the adjustment signal and configured to provide the variable supply voltage, wherein the variable supply voltage begins an adjustment based on the adjustment signal, and wherein the switcher controller is configured to determine a time that the DVS signal is in the first state by counting clock edges of a clock during the first state.

12. The integrated circuit with dynamic voltage scaling of claim 11 wherein the processor core configured to provide a dynamic voltage scaling (DVS) signal is further configured to provide a DVS signal that is a binary signal, where the time the binary signal is in a first state indicates a direction of change fox the variable supply voltage for the processor.

13. The integrated circuit of claim 11 wherein the switcher controller is configured to provide the adjustment signal, where the adjustment signal is based on a number of clock edges of a clock during the first state.

14. The integrated circuit of claim 13 wherein the switcher controller is configured to use the adjustment signal to incrementally change the variable supply voltage, wherein the direction of the change is based on the number of clock edges of the clock while the DVS signal is in the first state.

15. The integrated circuit of claim 14 wherein the switcher controller is configured to use the adjustment signal to decrement the variable supply voltage when the number of clock edges is a first number and to increment the variable supply voltage when the number of clock edges is a second number.

16. The integrated circuit of claim 15 wherein the switcher controller is further configured to use the adjustment signal to change the variable supply voltage to a predefined state when the number of clock edges is a third number.

17. The integrated circuit of claim 11 wherein the switcher controller further comprises a register and wherein the register includes a voltage step parameter that is programmable and the switcher controller uses the adjustment signal to change the variable supply voltage by the voltage step.

18. The integrated circuit of claim 17 wherein the voltage step is one of a fixed voltage step and a non uniform voltage step.

19. A switcher circuit providing dynamic voltage scaling and comprising:
   a switcher controller configured to monitor a signal from a processor for a first state, the signal indicative of a desired change in a variable supply voltage for the processor; to determine a time that the signal is in the first state, and to provide an adjustment signal, wherein the adjustment signal is based on the time that the signal is in the first state, wherein determine a time further comprises counting clock edges during the first state, and
   a power supply coupled to the adjustment signal and configured to provide a variable supply voltage to the processor, the variable supply voltage controlled by the adjustment signal after the determine a time that the signal is in the first state.

20. The switcher circuit of claim 19 wherein the switcher controller is configured to use the adjustment signal to decrement the variable supply voltage when the time that the signal is in the first state is a first value and to increment the variable supply voltage when the time that the signal is in the first state is a second value.

* * * * *